United States Patent
Koskela et al.

(10) Patent No.: US 12,238,804 B2
(45) Date of Patent: Feb. 25, 2025

(54) SETTING A DIFFERENT BWP EARLIER IN A CONNECTION ESTABLISHMENT PROCESS TO A WIRELESS NETWORK BY A UE WHEN TRANSITIONING FROM AN IDLE OR INACTIVE STATE

(71) Applicant: Nokia Technologies Oy, Espoo (FI)

(72) Inventors: Jarkko Koskela, Oulu (FI); Jorma Kaikkonen, Oulu (FI); Jussi-Pekka Koskinen, Oulu (FI); Jing He, Beijing (CN)

(73) Assignee: Nokia Technologies Oy, Espoo (FI)

( * ) Notice: Subject to any disclaimer, the term of this patent is extended or adjusted under 35 U.S.C. 154(b) by 220 days.

(21) Appl. No.: 17/636,071

(22) PCT Filed: Aug. 21, 2019

(86) PCT No.: PCT/CN2019/101830
§ 371 (c)(1),
(2) Date: Feb. 17, 2022

(87) PCT Pub. No.: WO2021/031163
PCT Pub. Date: Feb. 25, 2021

(65) Prior Publication Data
US 2022/0287138 A1    Sep. 8, 2022

(51) Int. Cl.
*H04W 76/27*    (2018.01)
*H04L 5/00*    (2006.01)
(Continued)

(52) U.S. Cl.
CPC .......... *H04W 76/27* (2018.02); *H04L 5/0092* (2013.01); *H04W 52/0212* (2013.01); *H04W 68/02* (2013.01)

(58) Field of Classification Search
CPC ............. H04W 28/0247; H04W 48/20; H04W 52/0212; H04W 68/00; H04W 68/005;
(Continued)

(56) References Cited

U.S. PATENT DOCUMENTS

2018/0270713 A1    9/2018    Park et al.
2019/0045491 A1    2/2019    Zhang et al.
(Continued)

FOREIGN PATENT DOCUMENTS

CN    108353320 A    7/2018
CN    109561471 A    4/2019
(Continued)

OTHER PUBLICATIONS

3GPP TSG-RAN WG2 #100, Reno, USA, Nov. 27-Dec. 1, 2017, R2-1712889, "Supporting BWP Operation in Stage-3 RRC", Mediatek Inc., 4pgs.
(Continued)

*Primary Examiner* — Quoc Thai N Vu
(74) *Attorney, Agent, or Firm* — Barta Jones, PLLC (57) ABSTRACT

A network node in a wireless network sends a selected BWP toward a UE, the selected BWP to be used by the UE during a connection procedure used to connect the UE to the wireless network after the UE enters an idle or inactive state. The selected BWP is different from an initial BWP that would have been used by the UE during the connection procedure. The network node receives from the user equipment a message for connection to the wireless network using the selected BWP. The UE receives the selected BWP and uses the selected BWP to send, while in one of an idle state or an inactive state, a message for connection to the wireless network using the selected BWP (e.g., and not the initial BWP).

12 Claims, 7 Drawing Sheets (51) Int. Cl.
*H04W 52/02* (2009.01)
*H04W 68/02* (2009.01)

(58) Field of Classification Search
CPC . H04W 68/02; H04W 72/0453; H04W 72/23; H04W 74/006; H04W 76/27; H04L 5/0092; Y02D 30/70
See application file for complete search history.

(56) References Cited

U.S. PATENT DOCUMENTS

| | | |
|---|---|---|
| 2019/0053029 A1 | 2/2019 | Agiwal et al. |
| 2019/0149421 A1 | 5/2019 | Jin et al. |
| 2019/0150200 A1* | 5/2019 | Chen ................ H04W 74/0833 370/329 |
| 2020/0374942 A1* | 11/2020 | Sivavakeesar ........ H04W 68/00 |
| 2021/0168810 A1* | 6/2021 | Chen ................ H04W 52/0219 |

FOREIGN PATENT DOCUMENTS

| | | |
|---|---|---|
| CN | 109587789 A | 4/2019 |
| EP | 3506713 A1 | 7/2019 |
| WO | WO 2018/190678 A1 | 10/2018 |
| WO | 2019/031913 A1 | 2/2019 |
| WO | 2019/097104 A1 | 5/2019 |
| WO | 2019/132234 A1 | 7/2019 |

OTHER PUBLICATIONS

"Further Clarification on BWP Configuration in RRC", Media Tek Inc., 3GPP TSG RAN WG2 Meeting AH-1801, R2-1800648, Jan. 2018, 3 pages.

"Msc-generator", Sourceforge, Retrieved on Apr. 2, 2024, Webpage available at : https://sourceforge.net/projects/msc-generator/.

"3rd Generation Partnership Project; Technical Specification Group Radio Access Network; NR; Radio Resource Control (RRC) protocol specification (Release 15)", 3GPP TS 38.331, V15.5.1, Apr. 2019, pp. 1-491.

International Search Report and Written Opinion received for corresponding Patent Cooperation Treaty Application No. PCT/CN2019/101830, dated May 20, 2020, 10 pages.

Notice of Allowance received for corresponding European Patent Application No. 19942569.5, dated May 6, 2024, 8 pages.

Office action received for corresponding Chinese Patent Application No. 201980099500 6, dated Sep. 26, 2024, 12 pages of office action and no page of translation available.

* cited by examiner

SETTING A DIFFERENT BWP EARLIER IN A CONNECTION ESTABLISHMENT PROCESS TO A WIRELESS NETWORK BY A UE WHEN TRANSITIONING FROM AN IDLE OR INACTIVE STATE

CROSS REFERENCE TO RELATED APPLICATION

This patent application is a U.S. National Stage application of International Patent Application Number PCT/CN2019/101830 filed Aug. 21, 2019, which is hereby incorporated by reference in its entirety.

TECHNICAL FIELD

This invention relates generally to wireless networks and, more specifically, relates to bandwidth part (BWP) assignment in a connection establishment process by the UE to the wireless network.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, at the beginning of the detailed description section.

A carrier Bandwidth Part (BWP) is a contiguous set of physical resource blocks, selected from a contiguous subset of common resource blocks on a given carrier. The carrier has some total bandwidth, and the BWPs are part of that. Usually, a limited number (e.g., four) BWPs in uplink (UL) and downlink (DL) can be assigned to a User Equipment (UE).

The network (NW) can configure a wider BWP (e.g., wider than an initial BWP) when the network has received the UE's context/capabilities, but at earliest in the RRCResume message (in the INACTIVE state) or RRCReconfiguration (in the IDLE state) in connection procedures. Because the NW does not know which BWPs the UE can support earlier than at these times, it is not possible to have wider BWP applied, e.g., already ready for use for msg3 (e.g., using an RRCResumeRequest or RRCSetupRequest message). The message msg3 is a message in a Random Access Channel (RACH) procedure where the UE is performing an initial access or reconnection to the network.

BRIEF SUMMARY

This section is intended to include examples and is not intended to be limiting.

In an exemplary embodiment, a method is disclosed that includes sending, by a network node in a wireless network and toward a user equipment, a selected bandwidth part to be used by the user equipment during a connection procedure used to connect the user equipment to the wireless network after the user equipment enters an idle or inactive state. The selected bandwidth part is different from an initial bandwidth part that would have been used by the user equipment during the connection procedure. The method includes receiving, by the network node and from the user equipment, a message for connection to the wireless network using the selected bandwidth part.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to perform operations comprising: sending, by a network node in a wireless network and toward a user equipment, a selected bandwidth part to be used by the user equipment during a connection procedure used to connect the user equipment to the wireless network after the user equipment enters an idle or inactive state, wherein the selected bandwidth part is different from an initial bandwidth part that would have been used by the user equipment during the connection procedure; and receiving, by the network node and from the user equipment, a message for connection to the wireless network using the selected bandwidth part.

An exemplary computer program product includes a computer-readable storage medium bearing computer program code embodied therein for use with a computer. The computer program code includes: code for sending, by a network node in a wireless network and toward a user equipment, a selected bandwidth part to be used by the user equipment during a connection procedure used to connect the user equipment to the wireless network after the user equipment enters an idle or inactive state, wherein the selected bandwidth part is different from an initial bandwidth part that would have been used by the user equipment during the connection procedure; and code for receiving, by the network node and from the user equipment, a message for connection to the wireless network using the selected bandwidth part.

In another exemplary embodiment, an apparatus comprises: means for sending, by a network node in a wireless network and toward a user equipment, a selected bandwidth part to be used by the user equipment during a connection procedure used to connect the user equipment to the wireless network after the user equipment enters an idle or inactive state, wherein the selected bandwidth part is different from an initial bandwidth part that would have been used by the user equipment during the connection procedure; and means for receiving, by the network node and from the user equipment, a message for connection to the wireless network using the selected bandwidth part.

In an exemplary embodiment, a method is disclosed that includes receiving, by a user equipment in a wireless network and from a network node, a selected bandwidth part to be used by the user equipment during a connection procedure used to connect the user equipment to the wireless network after the user equipment enters an idle or inactive state. The selected bandwidth part is different from an initial bandwidth part that would have been used by the user equipment during the connection procedure. The method includes sending, by the user equipment and toward the network node and while in one of an idle state or an inactive state, a message for connection to the wireless network using the selected bandwidth part.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to perform operations comprising: receiving, by a user equipment in a wireless network and from a network node, a selected bandwidth part to be used by the user equipment during a connection procedure used to connect the user equipment to the wireless network after the user equipment enters an idle or inactive state, wherein the selected bandwidth part is different from an initial bandwidth part that would have been used by the user equipment during the connection procedure; and sending, by user equipment and toward the network node and while in one of an idle state or an inactive state, a message for connection to the wireless network using the selected bandwidth part.

An exemplary computer program product includes a computer-readable storage medium bearing computer program code embodied therein for use with a computer. The computer program code includes: code for receiving, by a user equipment in a wireless network and from a network node, a selected bandwidth part to be used by the user equipment during a connection procedure used to connect the user equipment to the wireless network after the user equipment enters an idle or inactive state, wherein the selected bandwidth part is different from an initial bandwidth part that would have been used by the user equipment during the connection procedure; and code for sending, by user equipment and toward the network node and while in one of an idle state or an inactive state, a message for connection to the wireless network using the selected bandwidth part.

In another exemplary embodiment, an apparatus comprises: means for receiving, by a user equipment in a wireless network and from a network node, a selected bandwidth part to be used by the user equipment during a connection procedure used to connect the user equipment to the wireless network after the user equipment enters an idle or inactive state, wherein the selected bandwidth part is different from an initial bandwidth part that would have been used by the user equipment during the connection procedure; and means for sending, by user equipment and toward the network node and while in one of an idle state or an inactive state, a message for connection to the wireless network using the selected bandwidth part.

DETAILED DESCRIPTION OF THE DRAWINGS

The following abbreviations that may be found in the specification and/or the drawing figures are defined as follows:

3GPP third generation partnership project
5G fifth generation
5GC 5G core network
AMF access and mobility management function
BW bandwidth
BWP bandwidth part
capas capabilities
CU central unit
DCI downlink control information
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
gNB (or gNodeB) base station for 5G/NR, i.e., a node providing NR user plane and control plane protocol terminations towards the UE, and connected via the NG interface to the 5GC
I/F interface
LTE long term evolution
MAC medium access control
MME mobility management entity
ng or NG next generation
ng-eNB or NG-eNB next generation eNB
NR new radio
N/W or NW network
PDCP packet data convergence protocol
PHY physical layer
RACH random access channel
RAN radio access network
Rel release
RLC radio link control
RNA RAN-based notification area
RRH remote radio head
RRC radio resource control RU radio unit
Rx receiver
SDAP service data adaptation protocol
SGW serving gateway
SI system information
SIB system information block
SMF session management function
TS technical specification
Tx transmitter
UE user equipment (e.g., a wireless, typically mobile device)
UPF user plane function The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for setting a higher BWP earlier in a connection establishment process to a wireless network. Additional description of these techniques is presented after a system into which the exemplary embodiments may be used is described.

Figure 1:
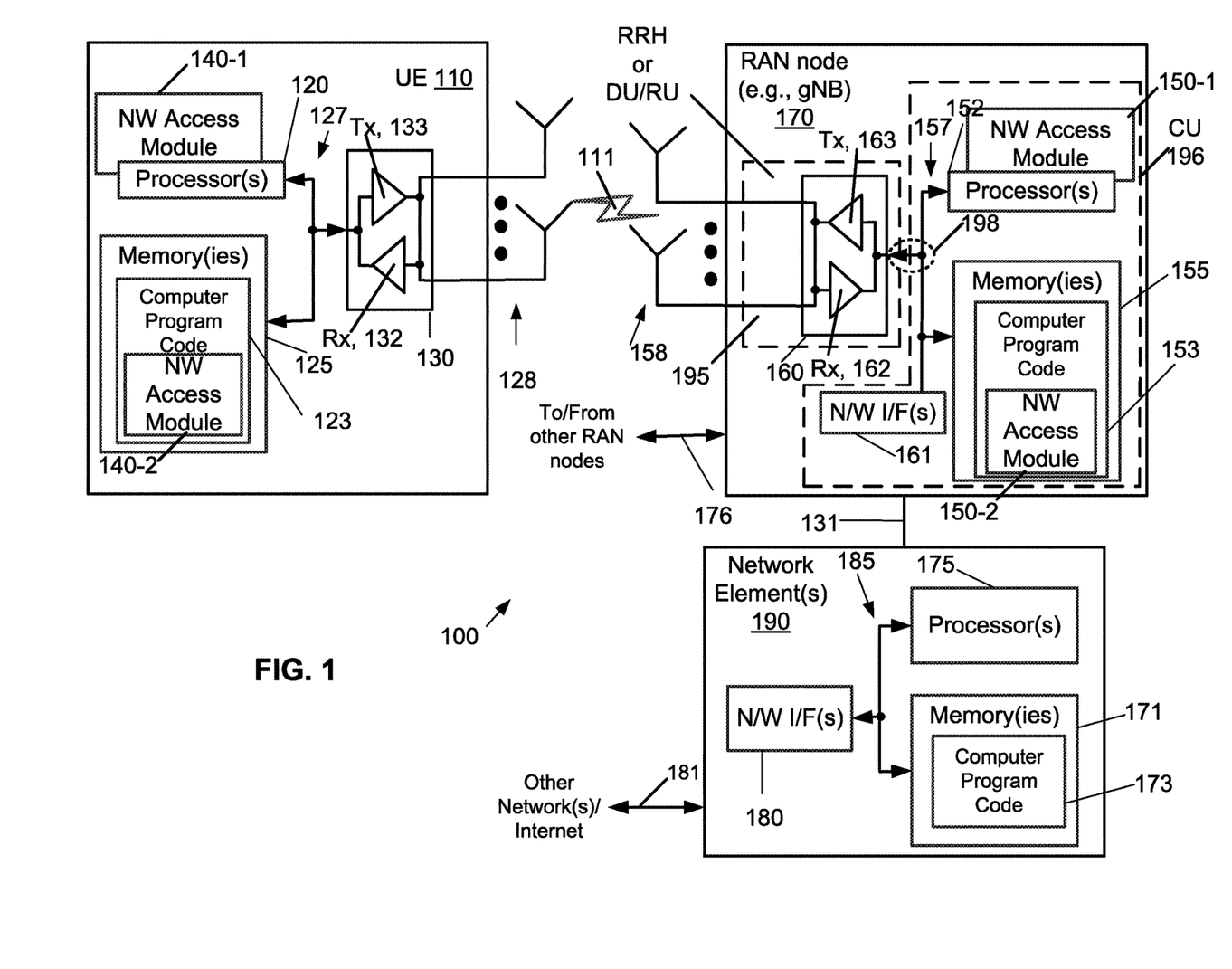
FIG. 1 is a block diagram of one possible and non-limiting exemplary system in which the exemplary embodiments may be practiced.

Turning to FIG. 1, this figure shows a block diagram of one possible and non-limiting exemplary system in which the exemplary embodiments may be practiced. A user equipment (UE) 110, radio access network (RAN) node 170, and network element(s) 190 are illustrated. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a NW access module 140, comprising one of or both parts 140-1 and/or 140-2, which may be implemented in a number of ways. The NW access module 140 may be implemented in hardware as NW access module 140-1, such as being implemented as part of the one or more processors 120. The NW access module 140-1 may be implemented also as an integrated circuit or through other hardware such as a programmable gate array. In another example, the NW access module 140 may be implemented as NW access module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 is a base station that provides access by wireless devices such as the UE 110 to the wireless network 100. The RAN node 170 may be, for instance, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC. In the text below the RAN node 170 is mainly referred to as a gNB, but this is merely exemplary and is not intended to be limiting. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a NW access module 150, comprising one of or both parts 150-1 and/or 150-2, which may be implemented in a number of ways. The NW access module 150 may be implemented in hardware as NW access module 150-1, such as being implemented as part of the one or more processors 152. The NW access module 150-1 may be implemented also as an integrated circuit or through other hardware such as a programmable gate array. In another example, the NW access module 150 may be implemented as NW access module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the NW access module 150 may be distributed, such as being distributed between the DU 195 and the CU 196, or be implemented solely in the DU 195.

The one or more network interfaces 161 communicate over a network such as via the links 176 and 131. Two or more RAN nodes 170 communicate using, e.g., link 176.

The link 176 may be wired or wireless or both and may implement, e.g., an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 198 also indicates those suitable network link(s).

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances (including Internet of Things devices) permitting wireless Internet access and possibly browsing, tablets with wireless communication capabilities, as well as portable units or terminals that incorporate combinations of such functions.

Having thus introduced one suitable but non-limiting technical context for the practice of the exemplary embodiments of this invention, the exemplary embodiments will now be described with greater specificity.

As described above, the network (NW) can configure a wider BWP (e.g., wider than an initial BWP) when the network has received the UE's context/capabilities, but at earliest in the RRCResume message (in the INACTIVE state) or RRCReconfiguration (in the IDLE state) in connection procedures. Because the NW does not know which BWPs the UE can support earlier than at these times, it was not previously possible to have wider BWP applied earlier in this process such as already available for use for msg3, as this is part of a connection (e.g., RACH) procedure.

To address this, the exemplary embodiments set a wider BWP earlier (e.g., than currently performed) in a connection establishment process to a wireless network. An introduction to these concepts is presented now and more detail is provided below. As an introduction, the following are examples of how to configure a wider BWP as early as practical in a connection procedure.

1) The NW (e.g., the gNB 170) would indicate in paging what is the to-be-applied BWP or multiple BWPs for the next connection.
2) The NW (e.g., the gNB 170) may broadcast multiple BWPs (possibly with a validity time and/or area given as well, e.g., RNA area) to be used in initial access. The validity time can have different time or area for each BWP, and also can configure a time or area to one single BWP.
   a) A problem with system information is the possible need for dynamism of allowed BWP configurations and a need to update those. A more dynamic mechanism could be used to avoid SI changes when some of BWPs become congested, and the like. This could be achieved, e.g., by MAC signaling and/or DCI. For instance, for using the system information as a way to broadcast multiple BWPs to the UE, if the NW changes the BWP in SIB, the NW can use MAC CE or DCI to indicate to the UE the BWPs in SIB that have been changed. Otherwise, only the legacy SI change can be used to inform the UE, and this way is relatively slow.
   b) Additionally, not all UEs 110 support the same maximum BWP, which is why it might be useful to indicate multiple BWPs in broadcast signaling (e.g., to multiple UEs 110). Alternatively, dedicated signaling options (e.g., to an individual UE) may be used. For example, this provides alternative ways for the network to send information to the UE, e.g., using SIB or dedicated signaling. For a multiple BWP broadcast, the eNB may monitor all BWPs to detect which one the UE uses to send MSG3.

3) The NW (e.g., the gNB 170) may provide BWP(s) in a release message. One issue to be addressed with this is that most likely BWPs will be only valid in the cell or cells on same frequency. One way to address this, is the NW could provide BWPs for multiple frequencies/cells in a message as well as or alternatively the BWP(s) would be applied for the INACTIVE state.

In terms of how the NW might select the configured BWP, this selection of BWP may be based on one or more of the following multiple considerations: incoming data type; required quality for connection; and the like.

Figure 2:
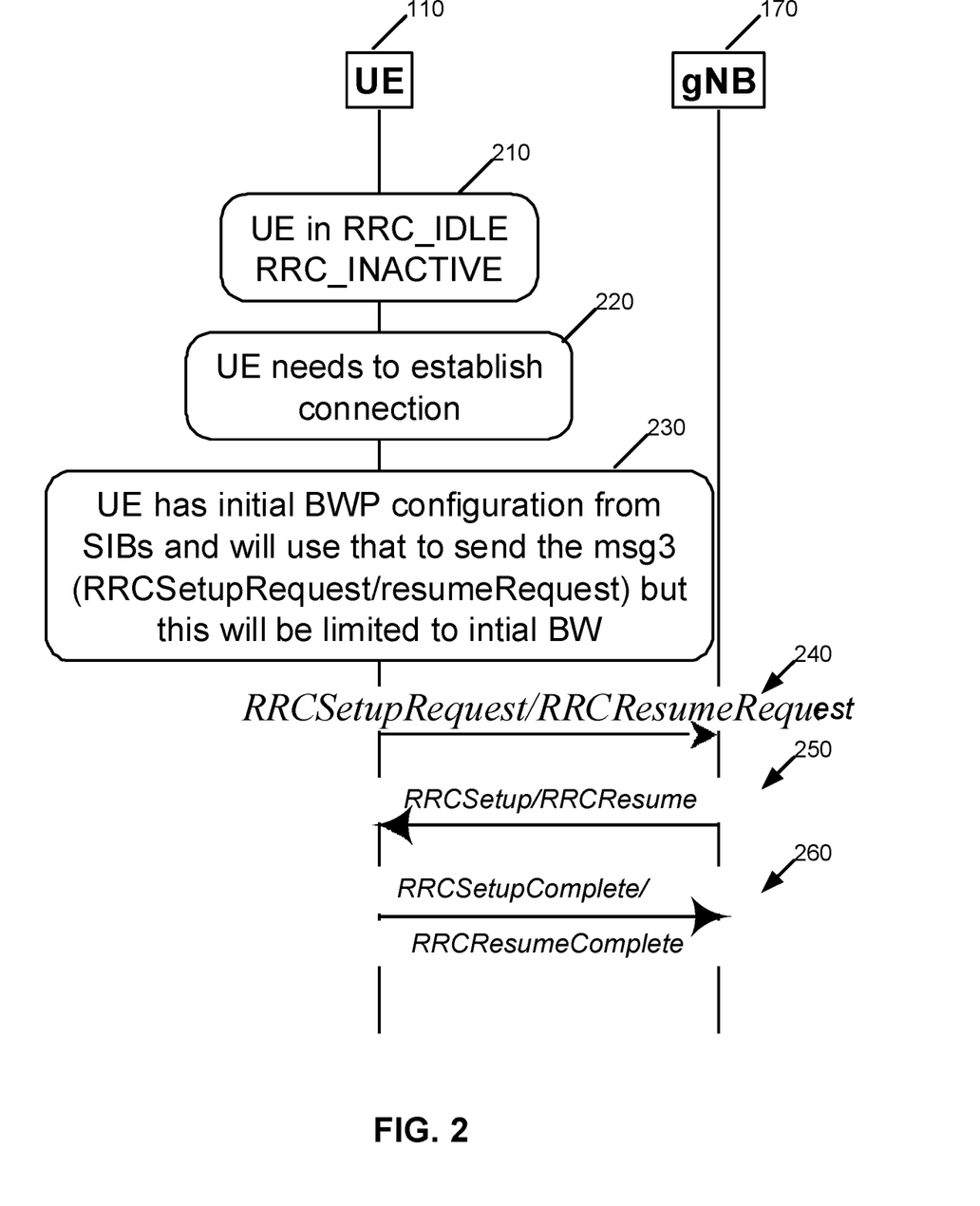
FIG. 2 is a signaling diagram of an existing procedure for connection of a UE from an idle state or inactive state to a wireless network, which requires the UE to use an initial BWP which is limited in bandwidth.

Additional detail is now presented. Referring to FIG. 2, this figure is a signaling diagram of an existing procedure for connection of a UE from an idle state or inactive state to connect to a wireless network which requires the UE to use an initial BWP which is limited in bandwidth. In FIG. 2, the UE is in an RRC idle (also IDLE or RRC_IDLE) state or inactive (also INACTIVE or RRC_INACTIVE) state. See block 210. At block 220, the UE determines it needs to establish a connection with the network 100. This determination could be made because the UE has data to send, paging, signaling. Signaling here means other signaling different from paging in downlink, which also can trigger UE to establish connection to network. In block 230, the UE has an initial BWP configuration (previously received) from one or more system information blocks (SIBs) and will use this BWP configuration to send the msg3 (e.g., RRCSetupRequest or ResumeRequest), but this is limited to the initial BW in the initial BWP. Block 240 illustrates the transmission by the UE of the RRCSetupRequest or ResumeRequest (also known as msg3), block 250 illustrates the gNB 170 sending an RRCSetup or RRCResume to the UE, and block 260 illustrates the UE 110 sending an RRCSetupComplete or RRCResumeComplete. This ends the connection process.

Figure 3:
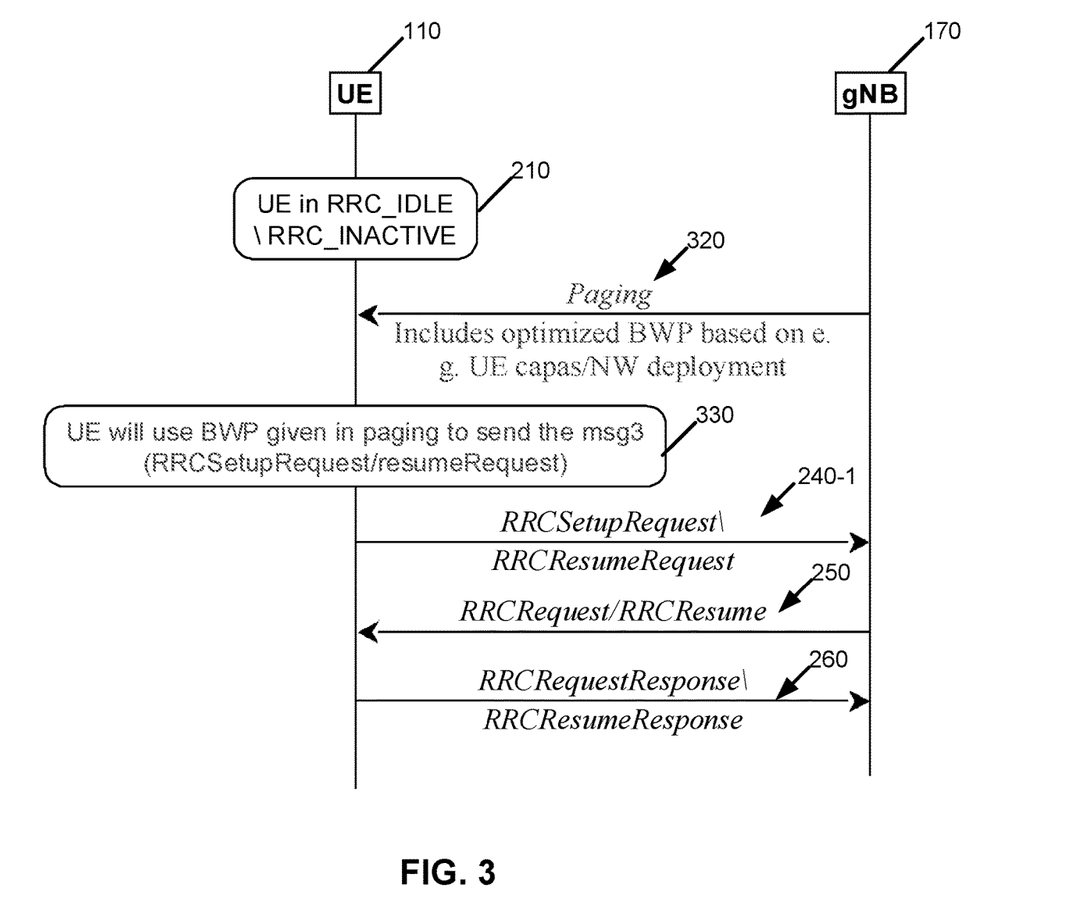
FIG. 3 is a signaling diagram for a BWP provided in paging option, in accordance with an exemplary embodiment.

Referring to FIG. 3, this figure is a signaling diagram for a BWP provided in paging option, in accordance with an exemplary embodiment. The UE is in an idle state or an inactive state in block 210. The gNB 170 sends paging to the UE 110 in step 320. The paging includes a selected (e.g., optimized) BWP based on, e.g., UE capabilities (capas) or NW deployment, the latter where the enabling feature is controlled by the NW. Step 240-1 uses a wider BWP as compared with the initial BWP used in step 240 in FIG. 2, and steps 250, and 260 are assumed to be the same as previously described. Note that the paging in step 320 causes the UE to establish a connection to the network.

Figure 4:
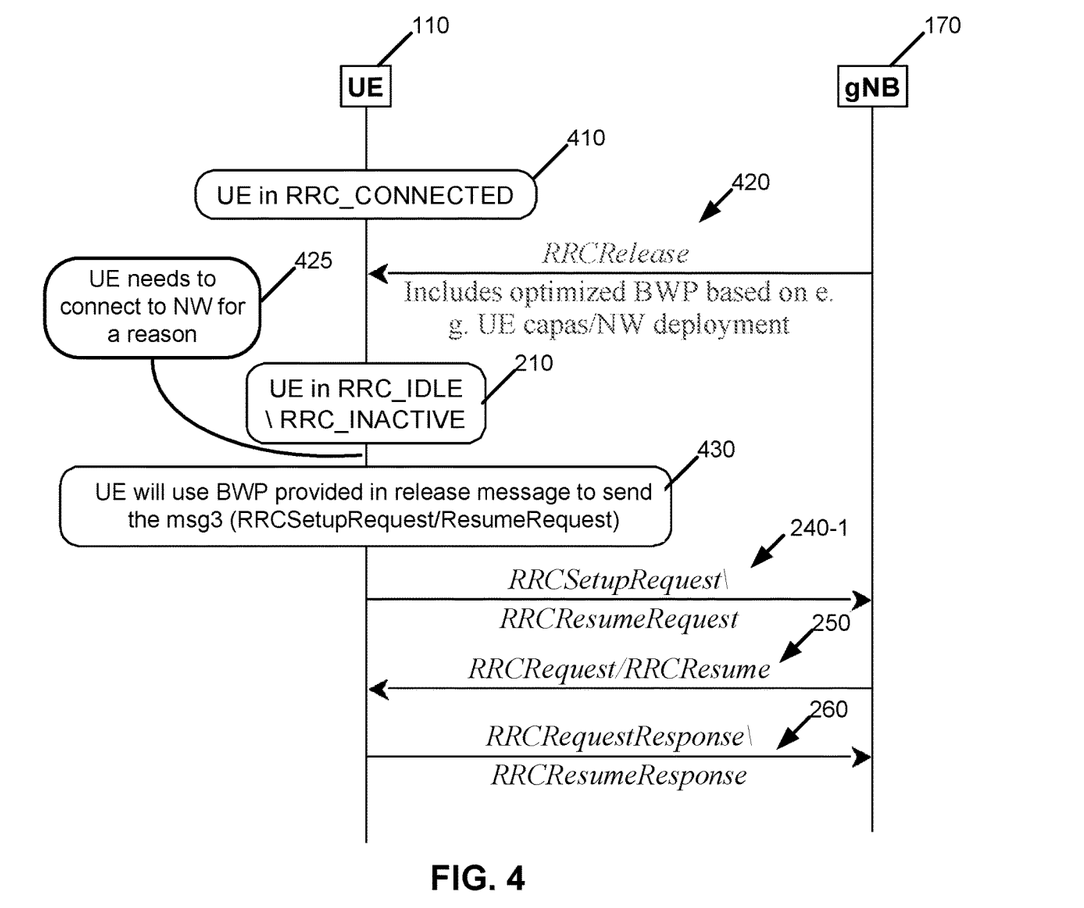
FIG. 4 is a signaling diagram for a BWP provided in a release message option, in accordance with an exemplary embodiment.

Turning to FIG. 4, this figure is a signaling diagram for a BWP provided in a release message option, in accordance with an exemplary embodiment. In this figure, the UE starts in the connected (also CONNECTED or RRC_CONNECTED) state in block 410, and the gNB 170 sends a release message (e.g., RRCRelease) in reference 420. The release message includes a selected (e.g., optimized) BWP based on, e.g., UE capas or NW deployment. The release message also causes the UE to transition from the connected state to one of the idle state or the inactive state (see block 210). In block 425, the UE needs to connect to the NW for a reason, such as to transmit data. In block 430, the UE uses the BWP provided in the release message to send the msg3 (RRCSetupRequest/RRCResumeRequest). Step 240-1 uses a wider BWP as compared with the initial BWP used in step 240 in FIG. 2, and steps 250, and 260 are assumed to be the same as previously described.

Figure 5:
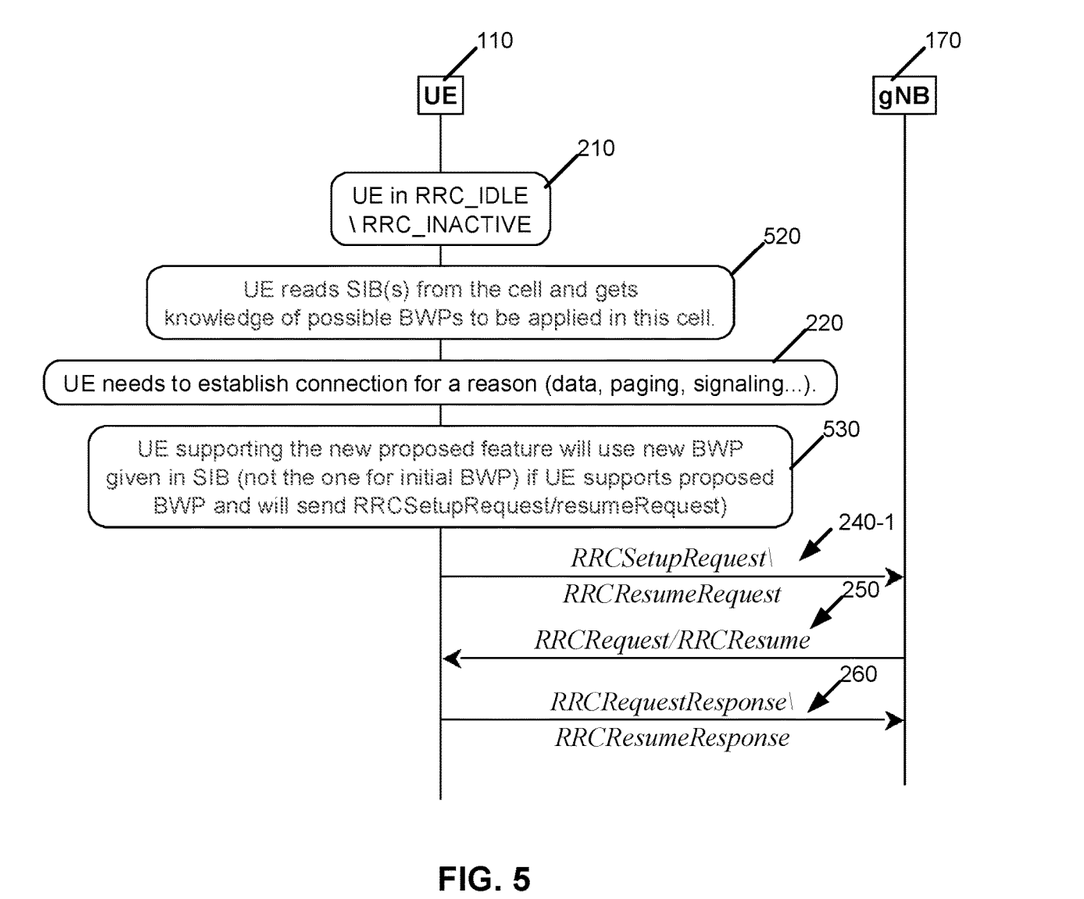
FIG. 5 is a signaling diagram for a BWP provided in system information option, in accordance with an exemplary embodiment.

Referring to FIG. 5, this figure is a signaling diagram for a BWP provided in system information option, in accordance with an exemplary embodiment. In this figure, the UE starts in an idle state or an inactive state (block 210). The UE reads SIB(s) from a cell (belonging to the gNB 170) and gets knowledge of possible BWPs (e.g., broadcast in the SIB(s)) to be applied in this cell. Note that this example has the gNB 170 broadcasting to multiple (e.g., all) UEs in a cell. In block 220, the UE needs to establish connection to the wireless network 100 for a reason. In block 530, the UE supporting the new proposed feature will use a new, wider BWP provided in the SIB(s) (and not the SIB with the initial, narrower BWP), if the UE also supports the proposed and selected wider BWP. The UE 110 will send the RRCSetupRequest or ResumeRequest message in step 240-1 (using a wider BWP than used in the initial BWP used in step 240 of FIG. 2), and the other steps 250, and 260 are assumed to be the same as previously described.

Figure 6:
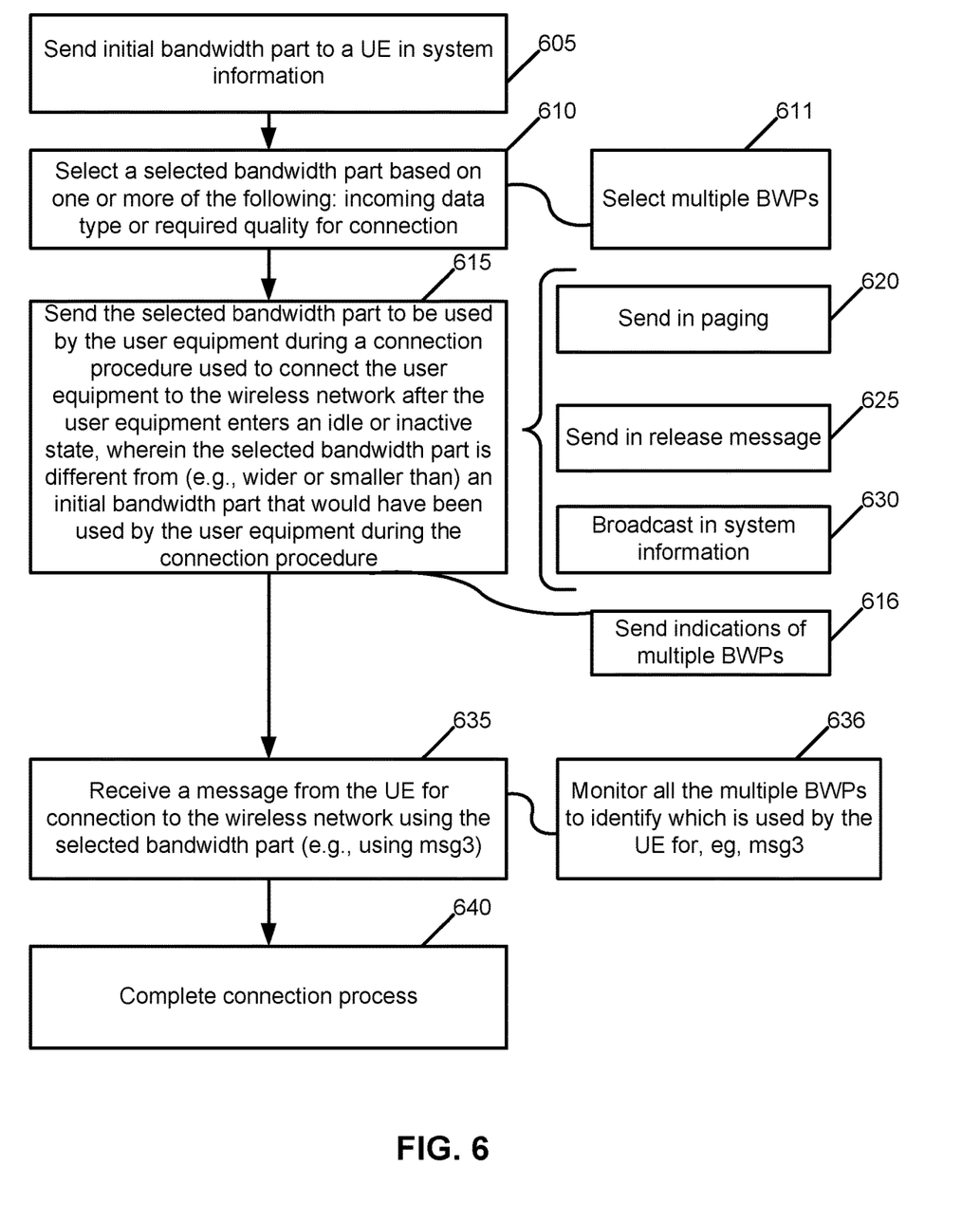
FIGS. 6 and 7 are logic flow diagrams performed by a network node and UE, respectively, for setting a wider BWP earlier in a connection establishment process to a wireless network, and illustrate the operation of exemplary methods, a result of execution of computer program instructions embodied on a computer readable memory, functions performed by logic implemented in hardware, and/or interconnected means for performing functions in accordance with exemplary embodiments.

Turning to FIG. 6, this figure is a logic flow diagram performed by a network node for setting a wider BWP earlier in a connection establishment process to a wireless network. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the NW access module 150 may include multiples ones of the blocks in FIG. 6, where each included block is an interconnected means for performing the function in the block. The blocks in FIG. 6 are assumed to be performed by a network node such as (e.g., or under control of) a base station such as gNB 170, e.g., under control of the NW access module 150 at least in part.

In block 605, the gNB 170 sends an initial bandwidth part to a UE in system information. The initial BWP is the BWP that would be used by the UE except for the techniques presented herein, which supply a wider BWP to the UE. That is, the bandwidth (BW) of the supplied BWP is wider than the BW of the (narrower) initial BWP. In block 610, the eNB 170 selects a selected bandwidth part based on one or more of the following: incoming data type or required quality for connection or UE power saving state.

In block 615, the gNB 170 sends the selected bandwidth part to be used by the user equipment during a connection procedure used to connect the user equipment to the wireless network after the user equipment enters an idle or inactive state. The selected bandwidth part is different from (e.g., wider or smaller than) an initial bandwidth part that would have been used by the user equipment during the connection procedure, e.g., as sent in block 605. The typical scenario is that the selected BWP is wider than the initial BWP. However, this idea may be extended to the other use case, for example, a smaller BWP case, which may be useful, e.g., for UE power saving. The selected BWP could be sent via the following: sent in paging (block 620, see FIG. 3); sent in a release message (block 625, see FIG. 4); or broadcast in system information (block 630, see FIG. 5). In block 635, the gNB 170 receives a message from the UE for connection to the wireless network using the selected bandwidth part (e.g., using msg3). In block 640, the gNB 170 completes the connection process, e.g., using steps 250 and 260 previously described.

FIG. 6 also illustrates another example, where in block 611 the gNB 170 selects multiple BWPs that might be used by the UE 110. In block 616, as part of the sending in block 615, the gNB 170 sends indications of multiple BWPs to the UE 110. The idea is to let the UE select one of the multiple BWPs, and the gNB 170 needs to monitor (see block 636) all these BWPs to identify which is used for msg3 and to receive (block 635) the message. In additional detail, it has been previously indicated that the NW knows if UE is using default (e.g. UE not supporting new feature) or wider BWP allowed in this cell via at least these two options:

1) The UE indicates a selected and chosen BWP, e.g., in RACH resources to the gNB; and/or
2) The NW (e.g., the gNB 170) allocates dedicated RACH resources to specific BWP configuration(s), and when the UE uses that RACH resource, the NW knows which BWP was chosen by the UE.

The network monitors all selected multiple BWPs to determine which one is used, and this is one possible technique. The network also can get help from the UE, e.g., where the UE indicates the selected BWP index in MSG1, or uses dedicated RACH resource allocated to each BWP.

Figure 7:
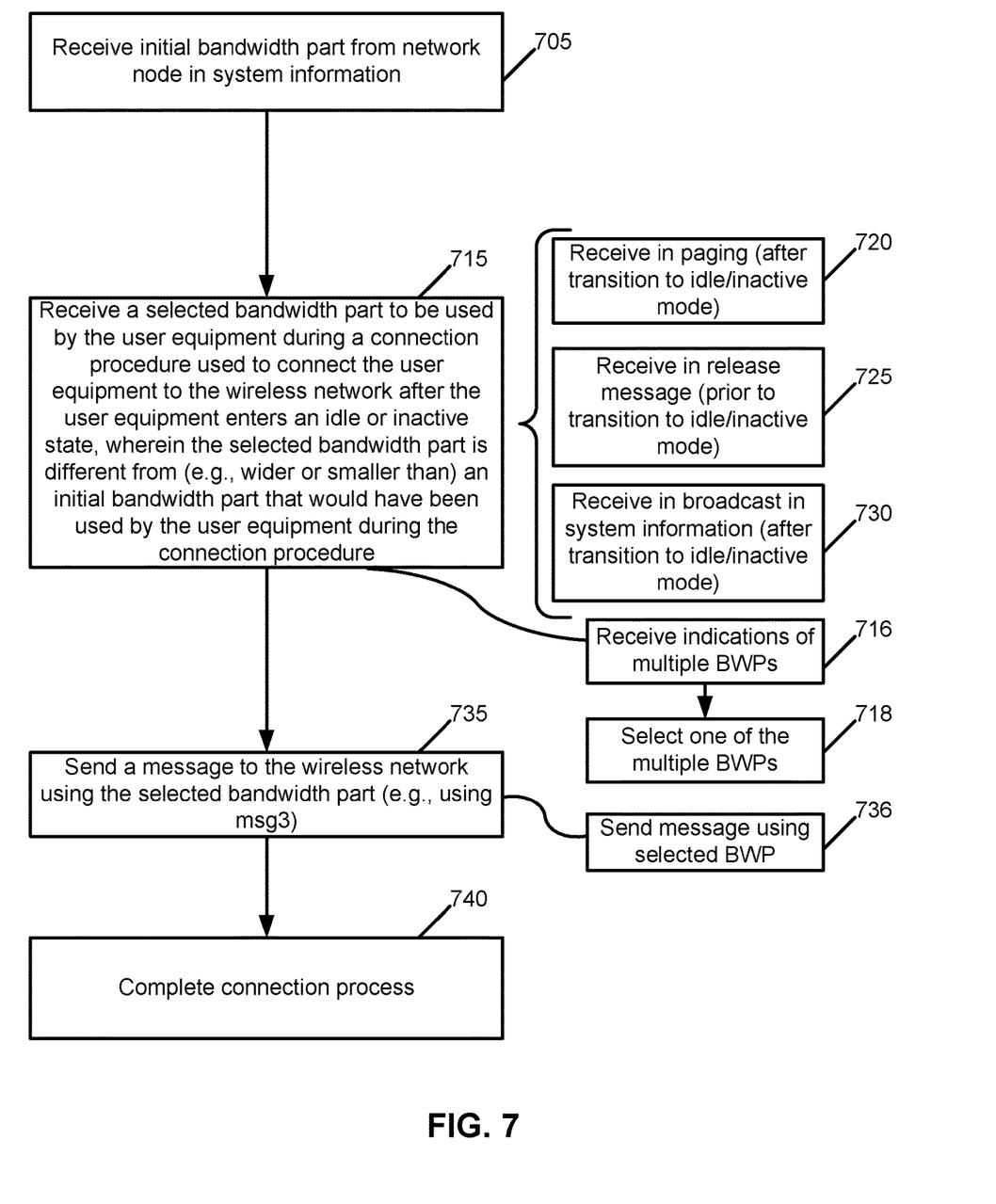

FIG. 7 is a logic flow diagram performed by a UE for setting a wider BWP earlier in a connection establishment process to a wireless network. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the NW access module 140 may include multiples ones of the blocks in FIG. 7, where each included block is an interconnected means for performing the function in the block. The blocks in FIG. 7 are assumed to be performed by the UE 110, e.g., under control of the NW access module 140 at least in part.

In block 705, the UE 110 receives an initial bandwidth part from a network node in system information. This is the initial, narrower BWP. In block 715, the UE 110 receives a selected bandwidth part to be used by the user equipment during a connection procedure used to connect the user equipment to the wireless network after the user equipment enters an idle or inactive state. The selected bandwidth part is different from (e.g., wider or smaller than) an initial bandwidth part that would have been used by the user equipment during the connection procedure and that was delivered to the UE in block 705. The receiving may be performed in paging (after transition to idle/inactive mode), see block 720 and FIG. 3. The receiving may also be performed in a release message (prior to transition to idle/inactive mode), see block 725 and FIG. 4. Finally, the receiving may be performed in broadcast in system information (after transition to idle/inactive mode), see block 730 and FIG. 5.

In block 735, the UE 110 sends a message to the wireless network using the selected bandwidth part (e.g., using msg3). In block 740, the UE 110 completes the connection process, e.g., using steps 250 and 260 previously described.

FIG. 7 also illustrates another example also illustrated by FIG. 6, where in block 716, as part of the receiving in block 715, the UE 110 receives indications of multiple BWPs to be used by the UE 110. As described above, the idea is to let the UE select (block 718) one of the multiple BWPs indicated in block 716, and the UE sends the message (e.g., msg3) on the selected BW in block 736. The gNB 170 needs to monitor (see block 636 of FIG. 6) all these BWPs to identify which is used for msg3 and to receive (block 735) the message.

Additional exemplary embodiments are as follows.

Example 1. A method, comprising:
sending, by a network node in a wireless network and toward a user equipment, a selected bandwidth part to be used by the user equipment during a connection procedure used to connect the user equipment to the wireless network after the user equipment enters an idle or inactive state, wherein the selected bandwidth part is different from an initial bandwidth part that would have been used by the user equipment during the connection procedure; and
receiving, by the network node and from the user equipment, a message for connection to the wireless network using the selected bandwidth part.

Example 2. The method of example 1, wherein the initial bandwidth part was previously supplied to the user equipment by the network node in system information.

Example 3. The method of any of examples 1 or 2, further comprising, prior to the sending, selecting the selected bandwidth part based on one or more of the following: incoming data type or required quality for connection or power saving state of the user equipment.

Example 4. The method of any of examples 1 to 3, wherein:
sending the selected bandwidth part to be used by the user equipment further comprises sending multiple selected bandwidth parts that may be used for a next connection by the user equipment to the wireless network; and
receiving the message further comprises:
determining which one of the multiple bandwidth parts the user equipment has used for the message by performing at least one of the following: monitoring all of the selected multiple bandwidth parts, or detecting user equipment access via one or more associated dedicated resources, or receiving indication from the user equipment of the selected chosen bandwidth part in one or more resources; and
receiving the message on the one selected bandwidth part.

Example 5. The method of any of examples 1 to 4, wherein sending the selected bandwidth part or parts to be used by the user equipment further comprises sending the selected bandwidth part or parts in a paging message after the user equipment has entered one of an idle state or an inactive state.

Example 6. The method of any of examples 1 to 4, wherein sending the selected bandwidth part or parts to be used by the user equipment further comprises sending the selected bandwidth part or parts in a release message used to cause the user equipment to transition from a connected state to one of an idle state or an inactive state.

Example 7. The method of any of examples 1 to 4, wherein sending the selected bandwidth part or parts to be used by the user equipment further comprises sending the selected bandwidth part in system information.

Example 8. The method of example 4, wherein the sending multiple selected bandwidth part parts further comprises including a validity time over which one or more of the multiple selected bandwidth parts may be used.

Example 9. The method of either example 4 or example 8, wherein the sending multiple selected bandwidth part further comprises including an area in which the one or more of the multiple selected bandwidth parts may be used.

Example 10. The method of any of examples 8 or 9, wherein the sending multiple selected bandwidth part is performed by one of the following: broadcasting the multiple selected bandwidth parts in system information; sending the multiple selected bandwidth parts in one or more paging messages; or sending the multiple selected bandwidth parts in one or more release messages.

Example 11. The method of any of examples 1 to 9, wherein the selected bandwidth part is one of the following: wider than initial bandwidth part; or smaller than the initial bandwidth part.

Example 12. A method, comprising:

receiving, by a user equipment in a wireless network and from a network node, a selected bandwidth part to be used by the user equipment during a connection procedure used to connect the user equipment to the wireless network after the user equipment enters an idle or inactive state, wherein the selected bandwidth part is different from an initial bandwidth part that would have been used by the user equipment during the connection procedure; and sending, by the user equipment and toward the network node and while in one of an idle state or an inactive state, a message for connection to the wireless network using the selected bandwidth part.

Example 13. The method of example 12, wherein the initial bandwidth part was previously received by the user equipment and sent by the network node in system information.

Example 14. The method of any of examples 12 or 13, wherein:

receiving the selected bandwidth part to be used by the user equipment further comprises receiving multiple selected bandwidth parts that may be used for a next connection by the user equipment to the wireless network;

the method further comprises selecting one of the multiple selected bandwidth parts; and sending the message further comprises sending the message on the one selected bandwidth part.

Example 15. The method of example 14, wherein the user equipment performs one of the following: performing an access via one or more associated dedicated resources, or sending an indication from the user equipment of the one selected bandwidth part in one or more resources.

Example 16. The method of any of examples 12 to 15, wherein receiving the selected bandwidth part or parts to be used by the user equipment further comprises receiving the selected bandwidth part or parts in a paging message after the user equipment has entered one of an idle state or an inactive state.

Example 17. The method of any of examples 12 to 14, wherein receiving the selected bandwidth part or parts to be used by the user equipment further comprises receiving the selected bandwidth part or parts in a release message used to cause the user equipment to transition from a connected state to one of an idle state or an inactive state.

Example 18. The method of any of examples 12 to 14, wherein receiving the selected bandwidth part or parts to be used by the user equipment further comprises receiving the selected bandwidth part in system information.

Example 19. The method of example 14, wherein the receiving the multiple selected bandwidth part or parts further comprises receiving a validity time over which one or more of the multiple bandwidth parts may be used, and performing the selecting the one selected bandwidth part and the sending the message based on the validity time.

Example 20. The method of either example 14 or example 19, wherein the receiving the multiple selected bandwidth parts further comprises receiving an area in which the one or more of the multiple bandwidth parts may be used, and performing the selecting the one selected bandwidth part and the sending the message based on the area.

Example 21. The method of any of examples 19 or 20, wherein the receiving the multiple selected bandwidth part is performed by one of the following: receiving in a broadcast the multiple selected bandwidth parts in system information; receiving the multiple selected bandwidth parts in one or more paging messages; or receiving the multiple selected bandwidth parts in one or more release messages.

Example 22. The method of any of examples 12 to 21, wherein the selected bandwidth part is one of the following: wider than initial bandwidth part; or smaller than the initial bandwidth part.

Example 23. A computer program, comprising code for performing the methods of any of examples 1 to 22, when the computer program is run on a computer.

Example 24. The computer program according to example 23, wherein the computer program is a computer program product comprising a computer-readable medium bearing computer program code embodied therein for use with the computer.

Example 25. The computer program according to example 23, wherein the computer program is directly loadable into an internal memory of the computer.

Example 26. An apparatus, comprising:

means for sending, by a network node in a wireless network and toward a user equipment, a selected bandwidth part to be used by the user equipment during a connection procedure used to connect the user equipment to the wireless network after the user equipment enters an idle or inactive state, wherein the selected bandwidth part is different from an initial bandwidth part that would have been used by the user equipment during the connection procedure; and means for receiving, by the network node and from the user equipment, a message for connection to the wireless network using the selected bandwidth part.

Example 27. The apparatus of example 23, wherein the initial bandwidth part was previously supplied to the user equipment by the network node in system information.

Example 28. The apparatus of any of examples 23 or 27, further comprising means, performed prior to the means for sending, for selecting the selected bandwidth part based on one or more of the following: incoming data type or required quality for connection or power saving state of the user equipment.

Example 29. The apparatus of any of examples 23 to 28, wherein:

the means for sending the selected bandwidth part to be used by the user equipment further comprises means for sending multiple selected bandwidth parts that may be used for a next connection by the user equipment to the wireless network; and the means for receiving the message further comprises:

means for determining which one of the multiple bandwidth parts the user equipment has used for the message by performing at least one of the following: monitoring all of the selected multiple bandwidth parts, or detecting user equipment access via one or more associated dedicated resources, or receiving indication from the user equipment of the selected chosen bandwidth part in one or more resources; and means for receiving the message on the one selected bandwidth part.

Example 30. The apparatus of any of examples 23 to 29, wherein the means for sending the selected bandwidth part or parts to be used by the user equipment further comprises means for sending the selected bandwidth part or parts in a paging message after the user equipment has entered one of an idle state or an inactive state.

Example 31. The apparatus of any of examples 23 to 29, wherein means for sending the selected bandwidth part or parts to be used by the user equipment further comprises means for sending the selected bandwidth part or parts in a release message used to cause the user equipment to transition from a connected state to one of an idle state or an inactive state.

Example 32. The apparatus of any of examples 23 to 29, wherein the means for sending the selected bandwidth part or parts to be used by the user equipment further comprises means for sending the selected bandwidth part in system information.

Example 33. The apparatus of example 29, wherein the means for sending multiple selected bandwidth part parts further comprises means for including a validity time over which one or more of the multiple selected bandwidth parts may be used.

Example 34. The apparatus of either example 29 or example 33, wherein the means for sending multiple selected bandwidth part further comprises means for including an area in which the one or more of the multiple selected bandwidth parts may be used.

Example 35. The apparatus of any of examples 33 or 34, wherein the means for sending multiple selected bandwidth part is performed by performing one of the following: broadcasting the multiple selected bandwidth parts in system information; sending the multiple selected bandwidth parts in one or more paging messages; or sending the multiple selected bandwidth parts in one or more release messages.

Example 36. The apparatus of any of examples 23 to 36, wherein the selected bandwidth part is one of the following: wider than initial bandwidth part; or smaller than the initial bandwidth part.

Example 37. A base station comprising any of the apparatus of examples 26 to 36.

Example 38. An apparatus, comprising:
means for receiving, by a user equipment in a wireless network and from a network node, a selected bandwidth part to be used by the user equipment during a connection procedure used to connect the user equipment to the wireless network after the user equipment enters an idle or inactive state, wherein the selected bandwidth part is different from an initial bandwidth part that would have been used by the user equipment during the connection procedure; and
means for sending, by the user equipment and toward the network node and while in one of an idle state or an inactive state, a message for connection to the wireless network using the selected bandwidth part.

Example 39. The apparatus of example 38, wherein the initial bandwidth part was previously received by the user equipment and sent by the network node in system information.

Example 40. The apparatus of any of examples 38 or 39, wherein:
the means for receiving the selected bandwidth part to be used by the user equipment further comprises means for receiving multiple selected bandwidth parts that may be used for a next connection by the user equipment to the wireless network;
the apparatus further comprises means for selecting one of the multiple selected bandwidth parts; and
the means for sending the message further comprises means for sending the message on the one selected bandwidth part.

Example 41. The apparatus of example 40, wherein the user equipment operates one of the following: means for performing an access via one or more associated dedicated resources, or means for sending an indication from the user equipment of the one selected bandwidth part in one or more resources.

Example 42. The apparatus of any of examples 38 to 41, wherein the means for receiving the selected bandwidth part or parts to be used by the user equipment further comprises means for receiving the selected bandwidth part or parts in a paging message after the user equipment has entered one of an idle state or an inactive state.

Example 43. The apparatus of any of examples 38 to 40, wherein the means for receiving the selected bandwidth part or parts to be used by the user equipment further comprises means for receiving the selected bandwidth part or parts in a release message used to cause the user equipment to transition from a connected state to one of an idle state or an inactive state.

Example 44. The apparatus of any of examples 38 to 40, wherein the means for receiving the selected bandwidth part or parts to be used by the user equipment further comprises means for receiving the selected bandwidth part in system information.

Example 45. The apparatus of example 40, wherein the means for receiving the multiple selected bandwidth part or parts further comprises means for receiving a validity time over which one or more of the multiple bandwidth parts may be used, and means for performing the selecting the one selected bandwidth part and the sending the message based on the validity time.

Example 46. The apparatus of either example 40 or example 45, wherein the means for receiving the multiple selected bandwidth parts further comprises means for receiving an area in which the one or more of the multiple bandwidth parts may be used, and means for performing the selecting the one selected bandwidth part and the sending the message based on the area.

Example 47. The apparatus of any of examples 19 or 20, wherein the means for receiving the multiple selected bandwidth part is performed by one of the following: receiving in a broadcast the multiple selected bandwidth parts in system information; receiving the multiple selected bandwidth parts in one or more paging messages; or receiving the multiple selected bandwidth parts in one or more release messages.

Example 48. The apparatus of any of examples 38 to 47, wherein the selected bandwidth part is one of the following: wider than initial bandwidth part; or smaller than the initial bandwidth part.

Example 49. A user equipment comprising any of the apparatus of examples 38 to 48.

Example 50. A wireless communication system comprising any of the apparatus of examples 26 to 36 and any of the apparatus of examples 38 to 48.

Example 51. An apparatus, comprising:
at least one processor; and
at least one memory including computer program code,
the at least one memory and the computer program code configured, with the at least one processor, to cause the apparatus to perform operations comprising:
sending, by a network node in a wireless network and toward a user equipment, a selected bandwidth part to be used by the user equipment during a connection procedure used to connect the user equipment to the wireless network after the user equipment enters an idle or inactive state, wherein the selected bandwidth part is different from an initial bandwidth part that would have been used by the user equipment during the connection procedure; and
receiving, by the network node and from the user equipment, a message for connection to the wireless network using the selected bandwidth part.

Example 52. The apparatus of example 51, wherein the at least one memory and the computer program code are further configured, with the at least one processor, to cause the apparatus to perform operations in any of the methods of examples 2 to 11.

Example 53. An apparatus, comprising:
at least one processor; and
at least one memory including computer program code,
the at least one memory and the computer program code configured, with the at least one processor, to cause the apparatus to perform operations comprising:
receiving, by a user equipment in a wireless network and from a network node, a selected bandwidth part to be used by the user equipment during a connection procedure used to connect the user equipment to the wireless network after the user equipment enters an idle or inactive state, wherein the selected bandwidth part is different from an initial bandwidth part that would have been used by the user equipment during the connection procedure; and
sending, by the user equipment and toward the network node and while in one of an idle state or an inactive state, a message for connection to the wireless network using the selected bandwidth part.

Example 54. The apparatus of example 53, wherein the at least one memory and the computer program code are further configured, with the at least one processor, to cause the apparatus to perform operations in any of the methods of examples 12 to 22.

Without in any way limiting the scope, interpretation, or application of the claims appearing below, a technical effect and advantage of one or more of the example embodiments disclosed herein is a maximum BWP used as soon as possible, which means connected sessions last a minimum time resulting in reduced power consumption and application perceived delays. Another technical effect and advantage of one or more of the example embodiments disclosed herein is the msg3 size can be larger, which means that a lot of enhancements potential is opened. Via frequency diversity, also the performance on msg3 (at least in interference limited scenarios) can be improved. Another technical effect and advantage of one or more of the example embodiments disclosed herein includes avoiding BWP switching time. That is, the first setting of the initial BWP then the subsequent setting of the wider BWP takes time in the UE to get the new BWP active, and the instant techniques avoid this time.

As used in this application, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:
1. A method, comprising:
broadcasting, by a network node in a wireless network, an initial bandwidth part to a user equipment in system information,
selecting, the network node, at least one bandwidth part based on an incoming data type, a required quality for a connection to be established, or both;
sending, by the network node toward the user equipment, an indication of the selected at least one bandwidth part to be used by the user equipment during a connection establishment procedure to connect the user equipment to the wireless network, wherein the selected at least one bandwidth part is wider than the initial bandwidth part, and wherein the selected at least one bandwidth part is sent via paging or system information after the user equipment transitions to idle/inactive state, the wider bandwidth part is utilized for an msg3 message of random access procedure; and
in response to receiving, by the network node and from the user equipment, the msg3 message for a connection establishment procedure in the selected bandwidth part, performing connection establishment.

2. The method of claim 1, wherein:
sending the selected bandwidth part to be used by the user equipment further comprises sending multiple selected bandwidth parts; and
the receiving the msg3 message further comprises:
monitoring all of the selected multiple bandwidth parts, or detecting user equipment access via one or more associated dedicated resources, or receiving indication from the user equipment of the selected bandwidth part in one or more resources; and.

3. The method of claim 2, wherein the sending multiple selected bandwidth part further comprises including a validity time over which one or more of the multiple selected bandwidth parts may be used.

4. The method of claim 2, wherein the sending multiple selected bandwidth part further comprises including an area in which the one or more of the multiple selected bandwidth parts may be used.

5. The method of claim 3, wherein the sending multiple selected bandwidth part is performed by one of the following: broadcasting the multiple selected bandwidth parts in system information; sending the multiple selected bandwidth parts in one or more paging messages; or sending the multiple selected bandwidth parts in one or more release messages.

6. The method of claim 1, wherein the selected bandwidth part is one of the following: smaller than the initial bandwidth part.

7. A method, comprising:
receiving, by a user equipment from a network node in a wireless network, an initial bandwidth part in system information;
receiving, an indication of at least one selected bandwidth part to be used by the user equipment during a connection establishment procedure to connect the user equipment to the wireless network, wherein the at least one selected bandwidth part is wider than the initial bandwidth part, wherein the at least one selected bandwidth part is received via paging or system information after the user equipment transitions to idle/inactive state, or in a release message prior to the user equipment transition to the idle/inactive state, the wider bandwidth part is utilized for an msg3 message of random access procedure; and
sending, by the user equipment and toward the network node, the msg3 message for connection establishment to the wireless network using the selected bandwidth part.

8. The method of claim 7, wherein:
receiving the indication of the selected bandwidth part further comprises receiving multiple selected bandwidth parts; and
selecting one of the multiple selected bandwidth parts.

9. The method of claim 8, wherein the receiving the multiple selected bandwidth parts further comprises receiving a validity time over which one or more of the multiple bandwidth parts may be used, and performing the selecting the one selected bandwidth part and the sending the msg3 message based on the validity time.

10. The method of claim 8, wherein the receiving the multiple selected bandwidth parts further comprises receiving an area in which the one or more of the multiple bandwidth parts may be used, and performing the selecting the one selected bandwidth part and the sending the msg3 message based on the area.

11. The method of claim 9, wherein the receiving the multiple selected bandwidth part is performed by one of the following: receiving in a broadcast the multiple selected bandwidth parts in system information; receiving the multiple selected bandwidth parts in one or more paging messages; or receiving the multiple selected bandwidth parts in one or more release messages.

12. The method of claim 7, wherein the selected bandwidth part is one of the following: smaller than the initial bandwidth part.

* * * * *